(12) United States Patent
Yoshida et al.

(10) Patent No.: US 12,412,939 B2
(45) Date of Patent: Sep. 9, 2025

(54) POWER SUPPLY DEVICE, AND VEHICLE AND POWER STORAGE DEVICE EACH EQUIPPED WITH SAME

(71) Applicant: SANYO Electric Co., Ltd., Osaka (JP)

(72) Inventors: Takashi Yoshida, Hyogo (JP); Tisato Magara, Hyogo (JP); Masato Koutari, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 349 days.

(21) Appl. No.: 17/905,829

(22) PCT Filed: Nov. 19, 2020

(86) PCT No.: PCT/JP2020/043106
§ 371 (c)(1),
(2) Date: Sep. 8, 2022

(87) PCT Pub. No.: WO2021/199488
PCT Pub. Date: Oct. 7, 2021

(65) Prior Publication Data
US 2023/0123492 A1    Apr. 20, 2023

(30) Foreign Application Priority Data
Mar. 31, 2020 (JP) ................. 2020-064058

(51) Int. Cl.
*H01M 10/48* (2006.01)
*B60L 50/64* (2019.01)
(Continued)

(52) U.S. Cl.
CPC ........... *H01M 10/488* (2013.01); *B60L 50/64* (2019.02); *H01M 50/209* (2021.01);
(Continued)

(58) Field of Classification Search
CPC ............. H01M 10/488; H01M 50/209; H01M 50/507; H01M 50/516; H01M 2220/20;
(Continued)

(56) References Cited

U.S. PATENT DOCUMENTS 9,673,430 B2 * 6/2017 Seto ................ B60L 50/66
11,050,107 B2 * 6/2021 Fukuoka ............. H01M 50/289
(Continued)

FOREIGN PATENT DOCUMENTS

CN    103460448 B  *  1/2017 .......... H01M 2/1016
CN    106605316 A     4/2017
(Continued)

OTHER PUBLICATIONS

WO-2015159524-A1 English Translation (Year: 2015).*
(Continued)

*Primary Examiner* — James A Shriver, II
*Assistant Examiner* — Michael T. Walsh
(74) *Attorney, Agent, or Firm* — WHDA, LLP

(57) ABSTRACT

Power supply device includes: a battery stack in which a plurality of battery cells each having an electrode terminal on an upper surface of an outer covering can are stacked; and a plurality of bus bars connecting electrode terminals of adjacent battery cells to each other. Bus bar includes window opened through which a part of electrode terminal of battery cell can be visually recognized in a state of being overlapped with electrode terminal in plan view. As a result, even when bus bar is overlapped on electrode terminal, electrode terminal on the lower side can be visually recognized through window, so that the connection position and the height can be confirmed, and the reliability of connection can be enhanced.

15 Claims, 13 Drawing Sheets

(51) Int. Cl.
  *H01M 50/209* (2021.01)
  *H01M 50/507* (2021.01)
  *H01M 50/516* (2021.01)
  *B60L 50/51* (2019.01)
  *B60L 50/61* (2019.01)

(52) U.S. Cl.
  CPC ....... *H01M 50/507* (2021.01); *H01M 50/516* (2021.01); *B60L 50/51* (2019.02); *B60L 50/61* (2019.02); *H01M 2220/20* (2013.01)

(58) Field of Classification Search
  CPC ............. H01M 10/482; H01M 50/211; H01M 50/503; H01M 50/505; H01M 50/522; H01M 50/548; H01M 50/566; H01M 10/44; H01M 50/569; H01M 50/50; H01M 50/20; H01M 50/249; H01M 50/543; H01M 50/55; B60L 50/64; B60L 50/51; B60L 50/61; Y02E 60/10
  See application file for complete search history.

(56) References Cited

U.S. PATENT DOCUMENTS

| | | | | |
|---|---|---|---|---|
| 11,177,538 | B2 * | 11/2021 | Yanagida | H01M 10/425 |
| 11,289,773 | B2 * | 3/2022 | Okada | B23K 26/323 |
| 11,374,290 | B2 * | 6/2022 | Okada | H01M 50/562 |
| 11,978,924 | B2 * | 5/2024 | Kita | H02J 7/0063 |
| 12,036,878 | B2 * | 7/2024 | Uemura | H01M 50/209 |
| 2015/0079453 | A1 * | 3/2015 | Choi | H01M 50/505 |
| | | | | 429/158 |
| 2017/0237057 | A1 * | 8/2017 | Tsuruta | H01M 50/209 |
| | | | | 429/158 |
| 2020/0243830 | A1 * | 7/2020 | Tanaka | H02B 1/20 |
| 2021/0242541 | A1 * | 8/2021 | Sasaki | H01R 13/518 |

FOREIGN PATENT DOCUMENTS

| | | | | |
|---|---|---|---|---|
| JP | 2001016707 A | * | 1/2001 | ........... H01R 11/288 |
| JP | 2012009319 A | * | 1/2012 | |
| JP | 2014063696 A | * | 4/2014 | |
| JP | 5574183 B2 | * | 8/2014 | |
| JP | 2015041610 A | * | 3/2015 | |
| JP | 5940374 B | | 6/2016 | |
| JP | 5940374 B2 | * | 9/2016 | |
| JP | 6299537 B | | 3/2018 | |
| JP | 2019160727 A | * | 9/2019 | |
| JP | 2022007367 A | * | 1/2022 | ........ H01M 10/0525 |
| KR | 20190053124 A | * | 5/2019 | |
| KR | 102116187 B1 | | 6/2020 | |
| WO | WO-2014024430 A1 | * | 2/2014 | ........... B60L 11/1855 |
| WO | WO-2015159524 A1 | * | 10/2015 | ........... H01M 10/425 |
| WO | 2016/035334 | | 3/2016 | |
| WO | 2019/159732 | | 8/2019 | |
| WO | WO-2021049667 A1 | * | 3/2021 | ........... H01M 10/482 |

OTHER PUBLICATIONS

JP-2001016707-A English Translation (Year: 2001).*
JP-2015041610-A English Translation (Year: 2015).*
JP-2019160727-A English Translation (Year: 2019).*
JP-20010160707-A English Translation (Year: 2001).*
WO-2014024430-A1 English Translation (Year: 2014).*
JP-2012009319-A English Translation (Year: 2012).*
JP-5574183-B2 English Translation (Year: 2014).*
English Translation of Chinese Search Report dated Nov. 22, 2023 issued in counterpart Chinese Patent Application No. 202080096504.1. (2 pgs.).
International Search Report of PCT application No. PCT/JP2020/043106 dated Dec. 22, 2020.

* cited by examiner

POWER SUPPLY DEVICE, AND VEHICLE AND POWER STORAGE DEVICE EACH EQUIPPED WITH SAME

CROSS-REFERENCE TO RELATED APPLICATIONS

This application is a U.S. national stage application of the PCT International Application No. PCT/JP2020/043106 filed on Nov. 19, 2020, which claims the benefit of foreign priority of Japanese patent application No. 2020-064058 filed on Mar. 31, 2020, the contents all of which are incorporated herein by reference.

TECHNICAL FIELD

The present disclosure relates to a power supply device, a vehicle provided with the same, and a power storage device.

BACKGROUND ART

A power supply device such as a battery module or a battery pack including a plurality of battery cells is used as a power source for a vehicle such as a hybrid vehicle or an electric vehicle, a power source for a power storage system for a factory, a home, or the like (See, for example, PTLs 1 to 3).

In such a power supply device, a plurality of chargeable and rechargeable battery cells are stacked. For example, as shown in a schematic sectional view of FIG. 16, power supply device 900 has end plates 903 on both end surfaces of battery stack 910 obtained by stacking battery cells 901 having prismatic outer covering can. End plates 903 are fastened to each other with bind bars 904. Battery cell 901 having a square shape is provided with, on the upper surface, positive and negative electrode terminals 902 separated from each other. Electrode terminals 902 of adjacent battery cells 901 are connected by bus bars 940 as shown in the enlarged exploded perspective view of FIG. 17.

However, as illustrated in the exploded perspective view of FIG. 18 and the plan view of FIG. 19, when bus bar 840 is larger than electrode terminal 802, there is a problem that electrode terminal 802 is hidden by bus bar 840 and the welding position cannot be seen.

In the case of laser welding, if there is a gap between parts to be welded, the strength of the welding is not stabilized and the reliability is affected. Therefore, it is necessary to perform laser welding without a gap. However, when electrode terminal 802 on the lower side is hidden by bus bar 840 as illustrated in FIG. 19, the gap therebetween cannot be confirmed.

CITATION LIST

Patent Literature

PTL 1: Unexamined Japanese Patent Publication No. 6299537
PTL 2: Unexamined Japanese Patent Publication No. 5940374
PTL 3: WO 2019-159732 A

SUMMARY OF THE INVENTION

Technical Problem

An object of an aspect of the present invention is to provide a power supply device with improved reliability of connection between an electrode terminal of a battery cell and a bus bar, and a vehicle and a power storage device including the power supply device.

Solution to Problem

A power supply device according to an aspect of the present invention includes: a battery stack in which a plurality of battery cells each including an electrode terminal on an upper surface of an outer covering can are stacked; and a plurality of bus bars that connect electrode terminals of adjacent battery cells to each other, in which each of the bus bars includes a window through which a part of the electrode terminal can be visually recognized in a state of overlapping the electrode terminal of the battery cells in plan view.

Advantageous Effect of Invention

According to a power supply device according to an aspect of the present invention, even when a bus bar is overlapped on an electrode terminal, a lower electrode terminal can be visually recognized through a window, so that a connection position and a height can be confirmed, and reliability of connection can be enhanced.

DESCRIPTION OF EMBODIMENT

Figure 1:
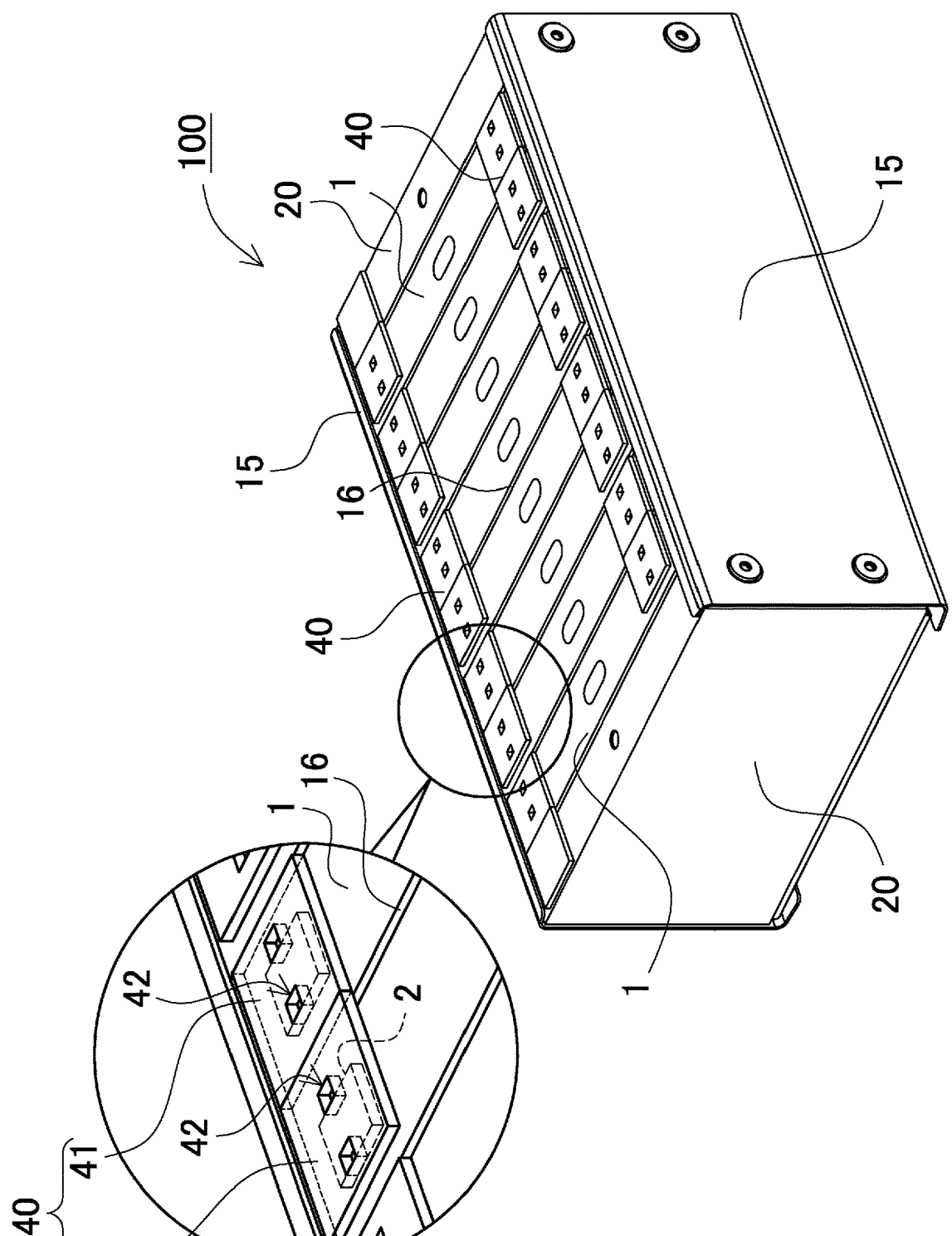
FIG. 1 is a perspective view with an enlarged view of a main part illustrating a power supply device according to a first exemplary embodiment of the present invention.

Exemplary embodiments of the present invention may be specified by the following configurations.

In a power supply device according to an exemplary embodiment of the present invention, in addition to the above configuration, the bus bar has a plurality of windows opened, and the electrode terminal can be visually recognized from the windows. With the above configuration, since different positions of the electrode terminal can be confirmed through the plurality of windows, the height of different parts of the electrode terminal can be measured, and the gap between the back surface of the bus bar and the electrode terminal can be calculated from the known thickness of the bus bar.

In a power supply device according to another exemplary embodiment of the present invention, in addition to any one of the above configurations, the bus bar includes the plurality of windows opened while separating the plurality of windows so as to sandwich a fixing region where the bus bar and the electrode terminal are connected. With the above configuration, since the height of the electrode terminal can be measured at two positions facing each other with the fixing region interposed therebetween, it is possible to more accurately calculate the gap between the electrode terminal and the bus bar in the fixing region.

In addition, in a power supply device according to another exemplary embodiment of the present invention, in addition to any of the configurations described above, the plurality of windows are opened at diagonal positions of the electrode terminal. With the above configuration, since the height of the electrode terminal can be measured at two positions in a diagonal line shape, it is possible to more accurately calculate the gap between the electrode terminal and the bus bar.

Furthermore, in a power supply device according to another exemplary embodiment of the present invention, in addition to any of the configurations described above, the windows includes an outer-shape window for detecting an outer shape of the electrode terminal, and a height window for detecting a height of the electrode terminal. With the above configuration, by preparing each of the outer-shape window for detecting the outer shape of the electrode terminal and the height window for detecting the height of the electrode terminal among the plurality of windows, processing such as outer shape detection and height detection can be performed in each window, and by providing the window at a position suitable for outer shape detection and a position suitable for height detection, an appropriate processing result can be obtained.

Furthermore, in a power supply device according to another exemplary embodiment of the present invention, in addition to any of the configurations described above, the window is opened in a rectangular shape in the bus bar.

Furthermore, in a power supply device according to another exemplary embodiment of the present invention, in addition to any of the configurations described above, the window is opened in an elongated hole shape longer than a width of the electrode terminal. With the above configuration, the facing end edges of the electrode terminal can be visually recognized from one window, and the inclination of the electrode terminal can be detected from one window.

Furthermore, in a power supply device according to another exemplary embodiment of the present invention, in addition to any of the configurations described above, the window is formed to be smaller than the electrode terminal. With the above configuration, it is possible to grasp and fix the position of the electrode terminal with the window through which only a part of the electrode terminal can be visually recognized without providing the bus bar with a round hole matching the projecting strip of the electrode terminal as in the conventional case.

Furthermore, in a power supply device according to another exemplary embodiment of the present invention, in addition to any of the configurations described above, a connecting part between the bus bar and the electrode terminal is a laser welding part.

Furthermore, in a power supply device according to another exemplary embodiment of the present invention, in addition to any of the configurations described above, the electrode terminal forms a recess. With the above configuration, it is possible to perform joining without using conventional engagement between the electrode terminal including a protrusion and the round hole of the bus bar.

Furthermore, in a power supply device according to another exemplary embodiment of the present invention, in addition to any of the configurations described above, the bus bar is formed to be larger than the electrode terminal of the battery cell in a state of overlapping the electrode terminal in plan view. With the above configuration, even when the bus bar is larger than the electrode terminal and the electrode terminal is inevitably hidden by the bus bar, the electrode terminal on the lower side can be visually recognized through the window, so that the welding position and the height can be confirmed, and the reliability of laser welding can be enhanced.

Further, an electric vehicle according to another exemplary embodiment of the present invention includes: any one of the above-mentioned power supply devices; a traveling motor to which electric power is supplied from the power supply device; a vehicle main body on which the power supply device and the motor are mounted; and wheels that are driven by the motor to make the vehicle main body travel.

Further, a power storage device according to another exemplary embodiment of the present invention includes: any one of the above-mentioned power supply devices; and a power supply controller that controls charging to and discharging from the power supply device, in which the power supply controller enables charging to the battery cell with electric power from the outside and controls the battery cell to perform charging.

Furthermore, a method for manufacturing a power supply device according to another exemplary embodiment of the present invention includes the steps of: preparing a battery stack in which a plurality of battery cells each including an electrode terminal are stacked, and a bus bar that connects electrode terminals of adjacent battery cells to each other, the bus bar including a window opened in advance; confirming positioning to confirm whether the bus bar and the electrode terminal are correctly positioned at a welding position by overlapping the bus bar on the electrode terminal of the battery cell, and visually recognizing a part of the electrode terminal through the window; and welding the bus bar whose positioning is confirmed to the battery cell. As a result, even when the bus bar is overlapped on the electrode terminal, the lower electrode terminal can be visually recognized through the window, so that the welding position and the height can be confirmed, and the reliability of welding can be enhanced.

Furthermore, in a method for manufacturing a power supply device according to another exemplary embodiment of the present invention, in addition to the above, the step of confirming positioning includes the steps of: measuring a height of the electrode terminal by visually recognizing a part of the electrode terminal through the window in a state where the bus bar is overlapped with the electrode terminal of the battery cell; and calculating a gap between a back surface of the bus bar and a front surface of the electrode terminal based on a known thickness of the bus bar. As a result, by acquiring the gap between the back surface of the bus bar and the electrode terminal, it is possible to take necessary measures since the strength of welding between the bus bar and the electrode terminal cannot be secured when the gap is large, and the reliability of welding can be improved.

Furthermore, in the method for manufacturing the power supply device according to another exemplary embodiment of the present invention, in addition to any of the above, the step of welding the bus bar to the battery cell is performed by laser welding.

Hereinafter, exemplary embodiments of the present invention are described with reference to the drawings. However, the exemplary embodiments described below are examples for embodying the technical idea of the present invention, and the present invention is not limited to the exemplary embodiments described below. Further, in the present specification, members indicated in the claims are not limited to the members of the exemplary embodiments. In particular, the dimensions, materials, shapes, and the relative arrangement of the constituent members described in the exemplary embodiments are not intended to limit the scope of the present invention only thereto unless otherwise specified and are merely illustrative examples. Note that the sizes and positional relationships of the members illustrated in the drawings may be exaggerated for clarity of description. Further, in the following description, the same names and marks indicate the same or similar members, and detailed description will be appropriately omitted. Furthermore, the elements constituting the present invention may be configured such that a plurality of elements are constituted of the same member to form one member that functions as the plurality of elements, or conversely, a function of one member can be shared and achieved by a plurality of members. In addition, the description in some examples or exemplary embodiments may be applied to other examples, exemplary embodiments, and the like.

A power supply device according to the exemplary embodiment is used for various applications such as a power source that is mounted on an electric vehicle as a hybrid vehicle or an electric automobile and supplies electric power to a drive motor, a power source that stores generated electric power of natural energy such as solar power generation or wind power generation, and a power source that stores midnight electric power, and is particularly used as a power source suitable for high-power and high-current applications. In the following example, an exemplary embodiment applied to a power supply device for driving an electric vehicle will be described.

First Exemplary Embodiment

Figure 2:
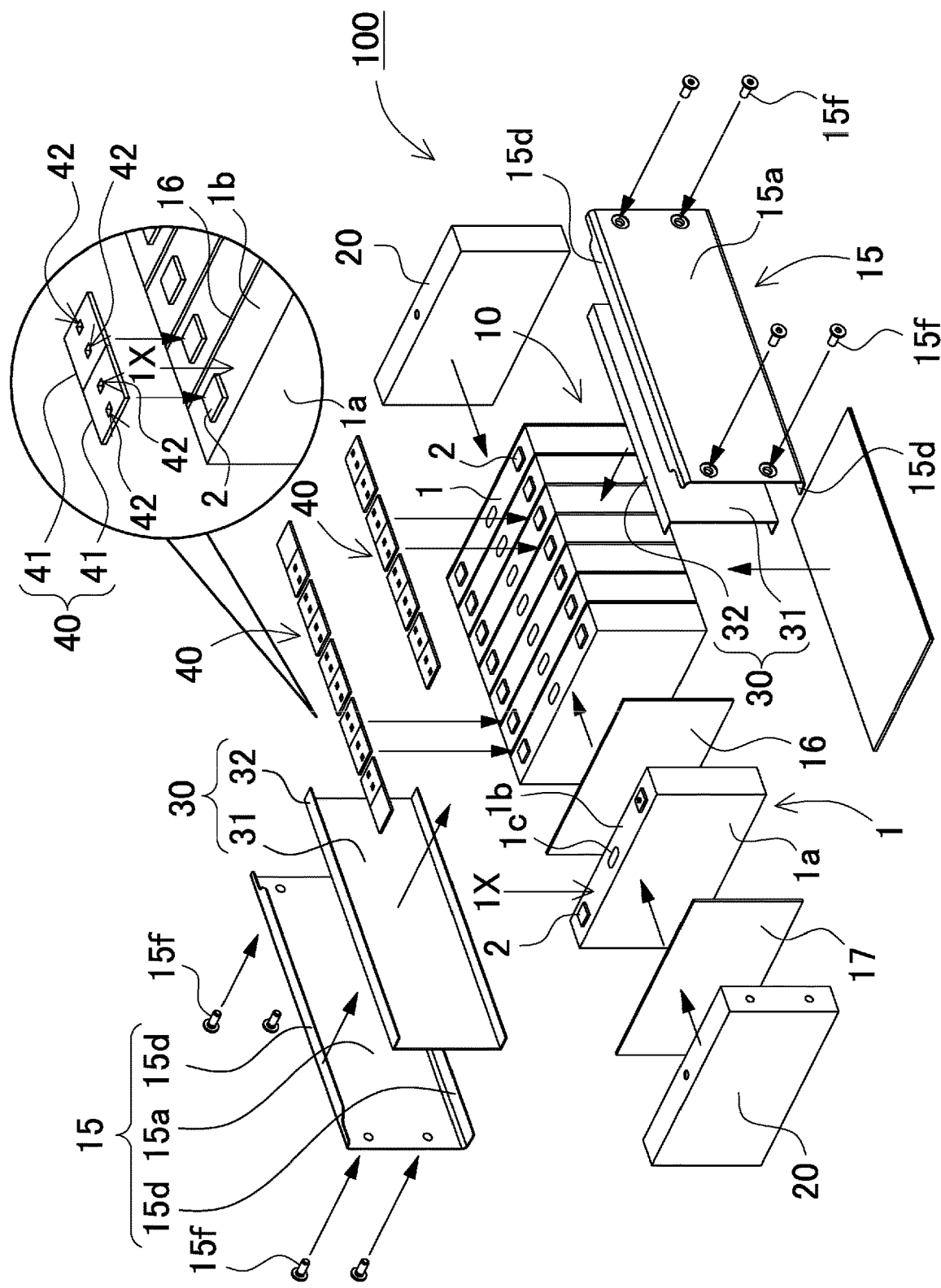
FIG. 2 is an exploded perspective view with an enlarged view of a main part of the power supply device illustrated in FIG. 1.

Power supply device 100 according to a first exemplary embodiment of the present invention is illustrated in FIGS. 1 and 2. In these drawings, FIG. 1 is a perspective view with an enlarged view of a main part of power supply device 100 according to a first exemplary embodiment, and FIG. 2 is an exploded perspective view with an enlarged view of the main part of power supply device 100 illustrated in FIG. 1.

Power supply device 100 shown in these drawings includes battery stack 10 in which a plurality of battery cells 1 are stacked with insulating spacers 16 interposed therebetween, a pair of end plates 20 covering both end surfaces of battery stack 10, a plurality of fastening members 15 for fastening end plates 20 to each other, and bus bar 40 arranged on the upper surface of battery stack 10.

Each of fastening members 15 is formed in a plate shape extended in a stacking direction of the plurality of battery cells 1. Fastening members 15 are disposed on opposite side surfaces of battery stack 10, respectively, to fasten end plates 20 to each other.

(Battery Stack 10)

As shown in FIG. 2, battery stack 10 includes the plurality of battery cells 1 each including positive and negative electrode terminals 2, and bus bars 40 connected to electrode terminals 2 of the plurality of battery cells 1 to connect the plurality of battery cells 1 in parallel and in series. The plurality of battery cells 1 are connected in parallel or in series through bus bars 40. Battery cell 1 is a chargeable and dischargeable secondary battery. In power supply device 100, the plurality of battery cells 1 are connected in parallel to form a parallel battery group, and a plurality of the parallel battery groups are connected in series, so that a large number of battery cells 1 are connected in parallel and in series. In power supply device 100 illustrated in FIG. 2, the plurality of battery cells 1 are stacked to form battery stack 10. Further, the pair of end plates 20 is disposed on both end surfaces of battery stack 10. End parts of fastening members 15 are fixed to end plates 20, and battery cells 1 in a stacked state are fixed in a pressed state.

(Battery Cell 1)

As illustrated in FIG. 2, battery cells 1 are prismatic batteries having a width larger than the thickness, in other words, a width smaller than the width, and are stacked in a thickness to form battery stack 10. Each of battery cells 1 can be, for example, a lithium ion secondary battery. Further, the battery cell can be any chargeable secondary battery such as a nickel metal hydride battery and a nickel cadmium battery. Battery cell 1 houses positive and negative electrode plates in exterior can 1a having a sealed structure together with an electrolyte solution. Outer covering can 1a is obtained by press-molding a metal sheet such as aluminum or an aluminum alloy into a prismatic shape, and hermetically sealing an opening part with sealing plate 1b. Sealing plate 1b is made of aluminum or aluminum alloy similarly as rectangular parallelepiped exterior can 1a, and positive and negative electrode terminals 2 are respectively fixed to both end parts of sealing plate 1b. Further, sealing plate 1b is provided with, between positive and negative electrode terminals 2, gas discharge valve 1c as a safety valve that opens in response to a change in pressure inside each of battery cells 1.

The plurality of battery cells 1 are stacked such that the thickness direction of each battery cell 1 is the stacking direction to constitute battery stack 10. At this time, the power of battery stack 10 can be increased by making the number of the battery cells stacked larger than usual. In such a case, battery stack 10 is long extended in the stacking direction. In battery cells 1, terminal surfaces 1X on which positive and negative electrode terminals 2 are provided are disposed on the same plane, and the plurality of battery cells 1 are stacked to form battery stack 10. A top surface of battery stack 10 is a surface on which gas discharge valves 1c of the plurality of battery cells 1 are provided.
(Electrode Terminal 2)

Figure 3:
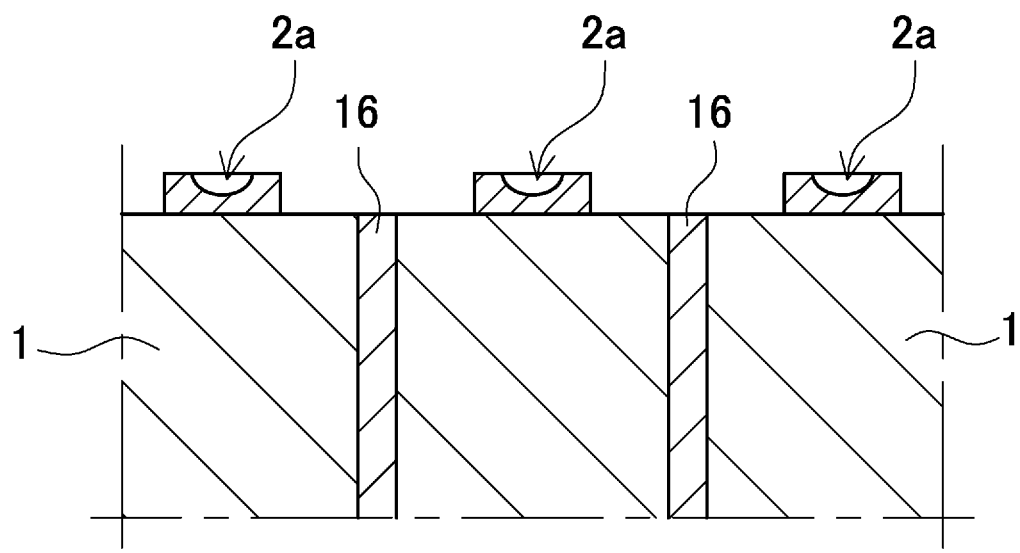
FIG. 3 is a schematic cross-sectional view illustrating battery cells of a power supply device according to a modified example.

In each of battery cells 1, as illustrated in FIG. 2 and the like, sealing plate 1b as a top surface is used as terminal surface 1X, and positive and negative electrode terminals 2 are fixed to both ends of terminal surface 1X. Electrode terminal 2 has a chamfered rectangular plate shape. However, the shape of the electrode terminal is not limited thereto, and may be a polygonal shape such as an octagonal shape, a circular shape, or an elliptical plate shape. It is not always necessary to chamfer the corner part of the plate-shaped electrode terminal. Alternatively, as illustrated in the schematic cross-sectional view of FIG. 3, recess 2a may be formed at the center of the plate shape.

Positions at which positive and negative electrode terminals 2 are fixed to sealing plate 1b of battery cell 1 are set to be positions where the positive electrode and the negative electrode are bilaterally symmetrical. This enables adjacent battery cells 1 to be connected in series by stacking battery cells 1 in an alternately and horizontally reversed manner and connecting electrode terminals 2 of the positive electrode and the negative electrode that are adjacent and close to each other by bus bars 40, as shown in FIG. 2. Note that the present invention does not specify the number and the connection state of the battery cells constituting the battery stack. The number of battery cells constituting the battery stack and the connection state of the battery cells may be modified in various manners, inclusive of other exemplary embodiments to be described later.

The plurality of battery cells 1 are stacked such that the thickness direction of each battery cell 1 is the stacking direction to constitute battery stack 10. In battery stack 10, the plurality of battery cells 1 are stacked such that terminal surfaces 1X on which positive and negative electrode terminals 2 are provided, that is, sealing plates 1b in FIG. 2 are flush with each other.
(Insulating Spacer 16)

In battery stack 10, insulating spacer 16 is interposed between battery cells 1 stacked adjacent to each other. Insulating spacer 16 is made of insulating material such as resin in the form of a thin plate or sheet. Insulating spacer 16 has a plate shape having substantially the same size as a facing surface of battery cell 1. Insulating spacer 16 can be stacked between adjacent battery cells 1 to insulate adjacent battery cells 1 from each other. Note that, as a spacer disposed between adjacent battery cells, a spacer having a shape in which a flow path of a cooling gas is formed between the battery cell and the spacer can also be used. In addition, the surface of the battery cell can be covered with an insulating material. For example, the surface of the exterior can except for the electrode terminal portion of the battery cell may be covered with a shrink film such as a polyethylene terephthalate (PET) resin.

Power supply device 100 illustrated in FIG. 2 includes end plates 20 disposed on respective opposite end surfaces of battery stack 10. Note that end surface spacer 17 may be interposed between each of end plates 20 and battery stack 10 to insulate the end plate and the battery stack from each other. End surface spacer 17 can also be formed in the shape of a thin plate or a sheet by using an insulating material such as resin.

In power supply device 100 according to the first exemplary embodiment, in battery stack 10 in which the plurality of battery cells 1 are stacked on each other, electrode terminals 2 of the plurality of battery cells 1 adjacent to each other are connected by bus bars 40 to connect the plurality of battery cells 1 in parallel and in series.
(End Plate 20)

As illustrated in FIG. 2, end plates 20 are disposed at both ends of battery stack 10, and are fastened via a pair of left and right fastening members 15 disposed along both side surfaces of battery stack 10. End plates 20 are disposed at both ends of battery stack 10 in the stacking direction of battery cells 1 and outside end surface spacers 17 to sandwich battery stack 10 from both ends.
(Fastening Member 15)

Both ends of fastening member 15 are fixed to end plates 20 disposed on both end surfaces of battery stack 10. End plates 20 are fixed by a plurality of fastening members 15, whereby battery stack 10 is fastened in the stacking direction. As illustrated in FIG. 2 and the like, fastening members 15 are each made of metal having a predetermined width and a predetermined thickness along the side surface of battery stack 10, and are disposed to face both side surfaces of battery stack 10. As each of fastening members 15, a metal sheet such as iron, preferably a steel plate can be used. Fastening member 15 made of a metal sheet is bent by press molding or the like to be formed into a predetermined shape.

Fastening member 15 is bent in a U-shape above and below plate-shaped fastening main surface 15a to form bent pieces 15d. Upper and lower bent pieces 15d cover upper and lower surfaces of battery stack 10 from corners on left and right side surfaces of battery stack 10. Fastening member 15 is fixed to outer peripheral surfaces of end plates 20 by screwing bolts 15f into a plurality of fastening screw holes opened in fastening main surface 15a. Note that the fixing between fastening main surface 15a and each of end plates 20 is not necessarily limited to the screwing using a bolt, and may be a pin, a rivet, or the like.

Power supply device 100 in which a large number of battery cells 1 are stacked is configured to bind the plurality of battery cells 1 by connecting end plates 20 disposed at both ends of battery stack 10 including the plurality of battery cells 1 by fastening members 15. By binding the plurality of battery cells 1 via end plates 20 and fastening members 15 having high rigidity, it is possible to suppress expansion, deformation, relative movement, malfunction due to vibration, and the like of battery cells 1 due to charging and discharging, and degradation.
(Insulating Sheet 30)

Further, insulating sheet 30 is interposed between each of fastening members 15 and battery stack 10. Insulating sheet 30 is made of material having an insulating property, such as resin, and insulates metal fastening member 15 from battery cell 1. Insulating sheet 30 shown in FIG. 2 and the like is constituted of flat plate 31 for covering the side surface of battery stack 10, and bent cover parts 32 respectively provided on an upper part and a lower part of flat plate 31. Bent cover parts 32 are bent in a U shape from flat plate 31 so as to cover bent pieces 15d of fastening member 15, and are then further folded back. Accordingly, since bent pieces 15d are covered with the insulating bent cover parts from the top surface to the side surface and the lower surface, unintended conduction between battery cells 1 and fastening members 15 can be avoided.

Further, bent pieces 15*d* press the top surface and the lower surface of each of battery cells 1 of battery stack 10 via bent cover parts 32. Consequently, each battery cell 1 is held in a height direction by being pressed by bent pieces 15*d* in a up-down direction, and even if vibration, impact, or the like is applied to battery stack 10, each battery cell 1 can be maintained so as not to be displaced in the up-down direction.

Note that, when the battery stack or the surface of the battery stack is insulated, for example, when the battery cell is housed in an insulating case, or covered with a heat-shrinkable film made of resin, or when an insulating paint or coating is applied to the surfaces of the fastening members, or when the fastening members are made of an insulating material, the insulating sheet can be unnecessary. In addition, regarding insulating sheet 30, bent cover part 32 may be provided only on the upper end in the case where insulation from bent piece 15*d* of fastening member 15 does not need to be taken into consideration near the lower surface of battery stack 10. This corresponds to, for example, the case where the battery cell is covered with a heat-shrinkable film.

(Bus Bar 40)

Both end parts of bus bar 40 are connected to positive and negative electrode terminals 2 to connect battery cells 1 in series or in parallel. In power supply device 100, battery cells 1 are connected in series to increase the output voltage, and battery cells 1 are connected in series and in parallel to increase the output voltage and the output current.

As the connection between bus bar 40 and electrode terminal 2, for example, welding can be used. Laser beam scanning can be used for welding. In particular, an inexpensive and high-output fiber laser can be suitably used. Alternatively, resistance welding may be used instead of laser welding. In the laser welding, bus bar 40 and electrode terminal 2 are partially melted and fixed by scanning a laser beam several times. Such a region where bus bar 40 and electrode terminal 2 are fixed is referred to as fixing region FA in the present specification. In the case of fixing by laser welding, fixing region FA is scanned with a laser beam to fix bus bar 40 and electrode terminal 2.

(Connecting Piece 41)

Bus bar 40 shown in FIGS. 1 and 2 connects opposed electrode terminals 2 of two adjacent battery cells 1. Therefore, bus bar 40 is extended so as to straddle electrode terminals 2 of adjacent battery cells 1, and covers electrode terminals 2. In other words, each bus bar 40 is formed by connecting two connecting pieces 41 connecting electrode terminals 2, and each connecting piece 41 is connected to electrode terminals 2 of different battery cells 1 to electrically connect these battery cells 1 to each other. That is, two electrode terminals 2 are arranged so as to be covered with one bus bar 40 from the upper surface. In the example of FIG. 1 and the like, connecting pieces 41 constitutes one bus bar 40 by connecting two connecting pieces 41, but the number of connecting pieces is not limited to two, and three or more connecting pieces may be connected to constitute a bus bar according to the number of connection and the connection form of the battery cells.

(Window 42)

Figure 4:
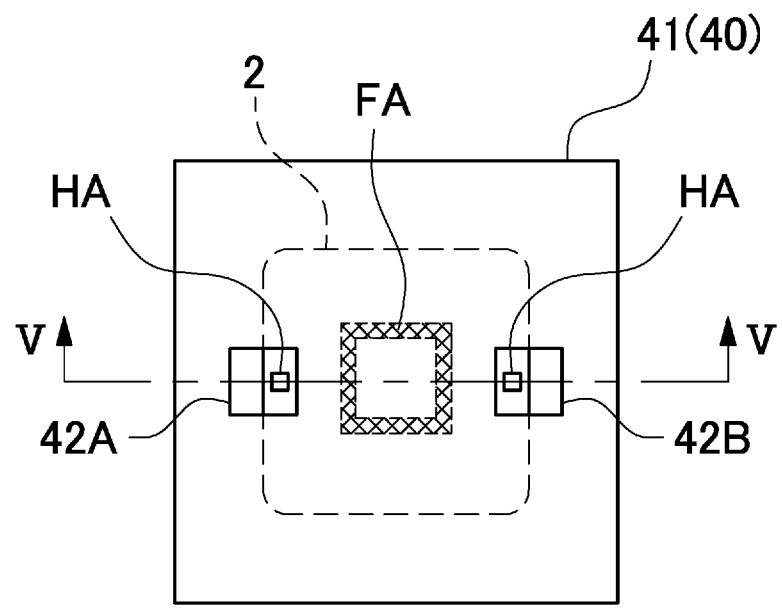
FIG. 4 is a schematic plan view illustrating a connecting piece of a bus bar.

As illustrated in the plan view of FIG. 4, window 42 is opened in each connecting piece 41 of bus bar 40. By opening window 42, a part of electrode terminal 2 can be visually recognized in a state where bus bar 40 overlaps electrode terminal 2 of battery cell 1. In this way, even if bus bar 40 is overlapped from above electrode terminal 2, electrode terminal 2 on the lower side can be visually recognized through window 42, the welding position and the height can be confirmed, and the reliability of the laser welding can be enhanced.

In the conventional power supply device, when the bus bar is overlapped on the upper surface of the electrode terminal at the time of welding the bus bar and the electrode terminal, there is a problem that the electrode terminal is hidden by the bus bar and the position of the electrode terminal cannot be visually recognized. For example, even if the position of the electrode terminal hidden by the bus bar is deviated from the assumed position, it cannot be confirmed from the bus bar, so that it has been considered that laser welding is not appropriately performed and a predetermined welding strength cannot be exhibited.

Therefore, in the present exemplary embodiment, window 42 is provided in bus bar 40 so that a part of electrode terminal 2 can be visually recognized, thereby improving the estimation accuracy of the welding position. In particular, by setting window 42 in advance at a position where the outer shape of electrode terminal 2 assumed as a welding position is accommodated, it is possible to confirm that electrode terminal 2 is correctly arranged.

Figure 16:
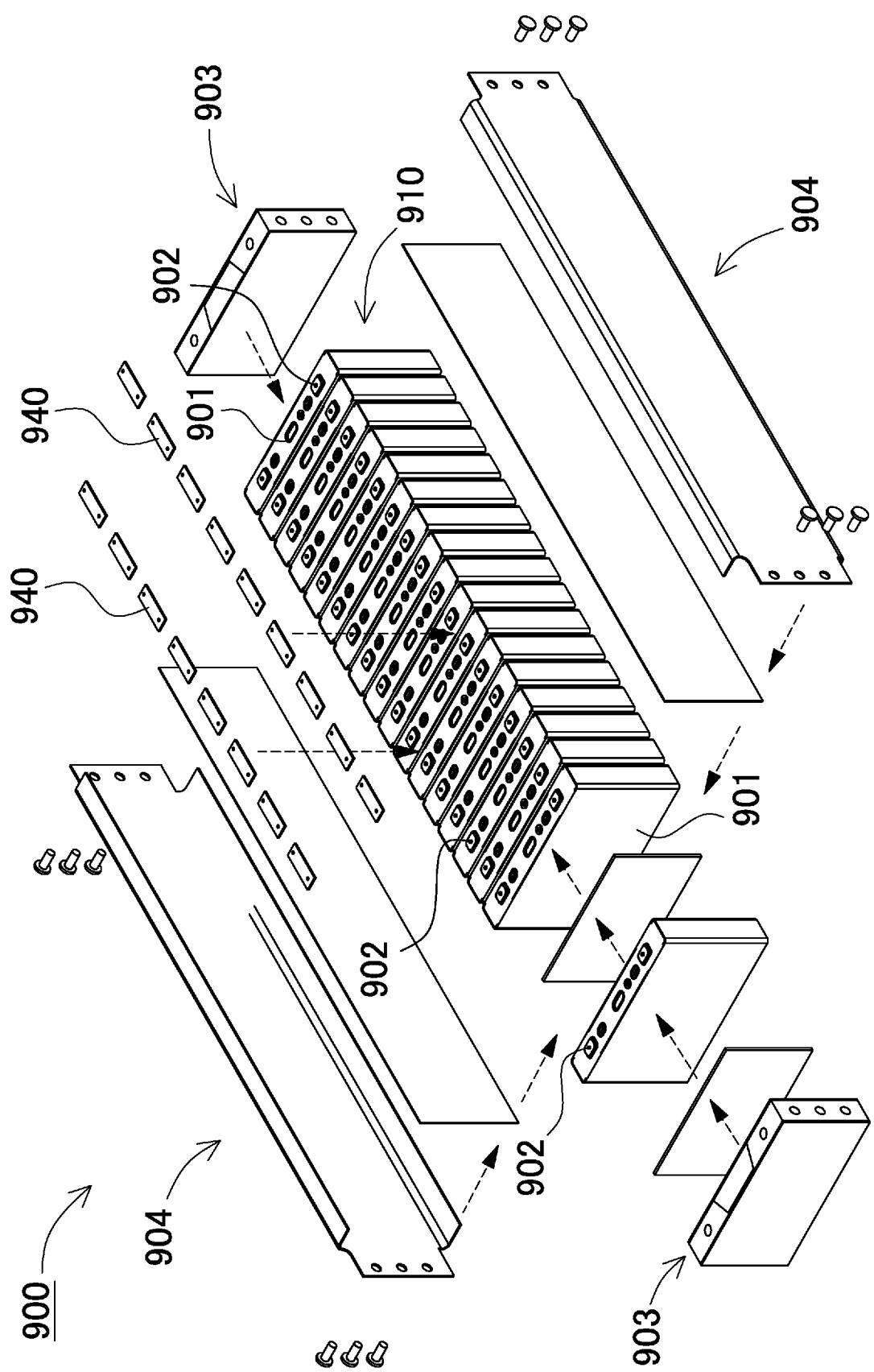
FIG. 16 is an exploded perspective view of a conventional power supply device.
Figure 17:
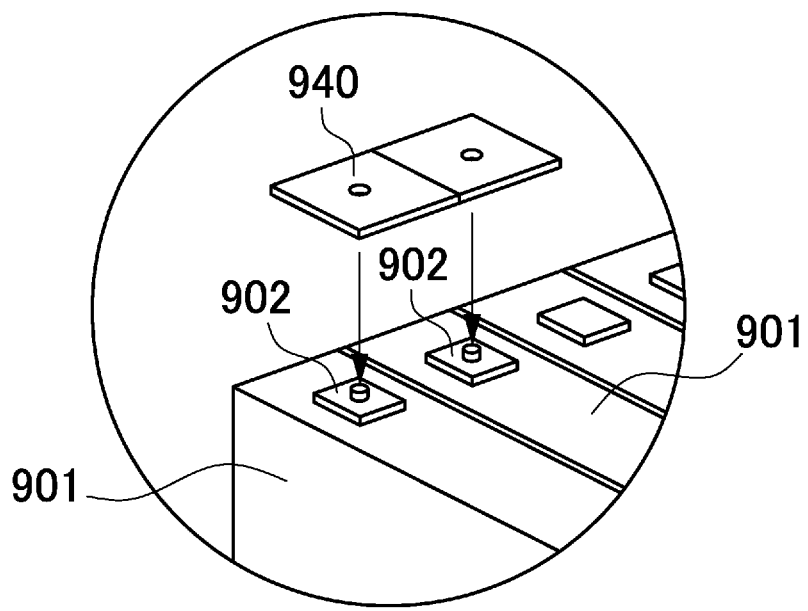
FIG. 17 is an exploded perspective view illustrating bus bars and electrode terminals in FIG. 16.
Figure 18:
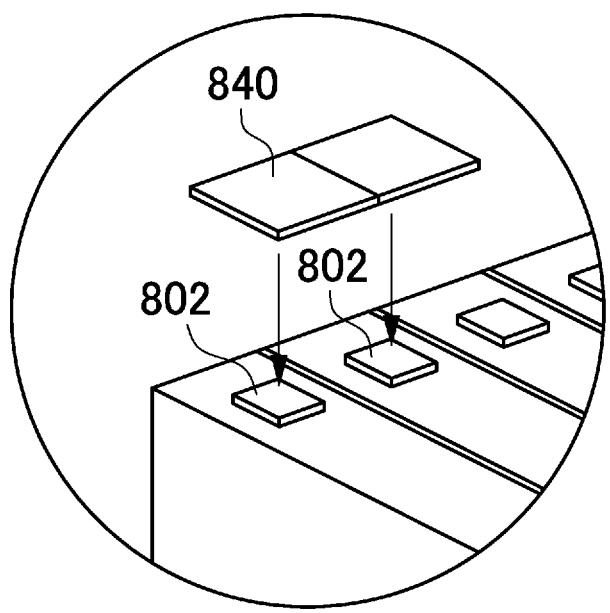
FIG. 18 is an exploded perspective view of a bus bar and electrode terminals.
Figure 19:
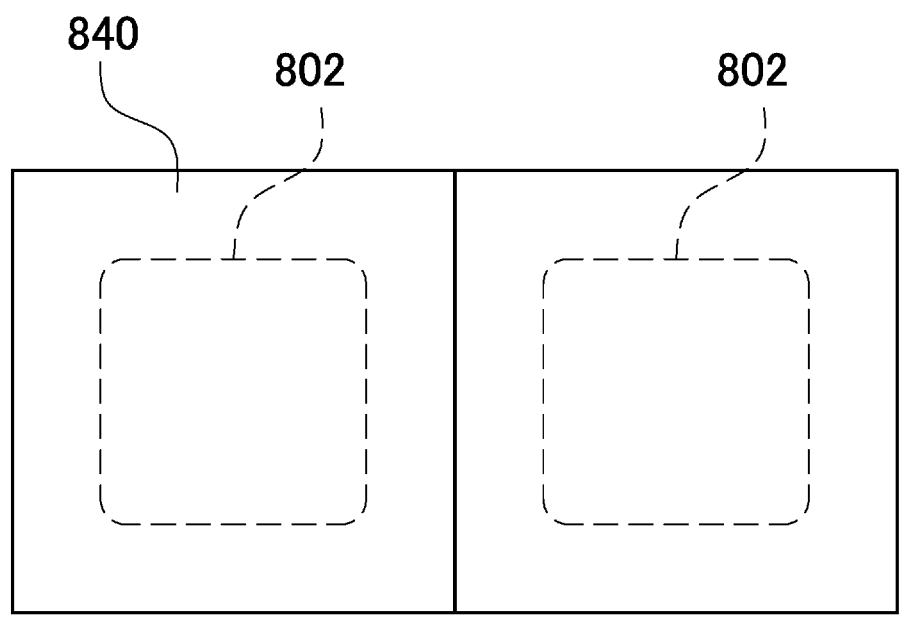
FIG. 19 is a schematic plan view illustrating a state in which the bus bar of FIG. 18 is overlapped on the electrode terminals.

As another point of view, in the conventional power supply device, as illustrated in the exploded perspective view of FIG. 16 and the enlarged perspective view of FIG. 17, a protrusion is formed at the central part of electrode terminal 902 formed on the upper surface of the outer covering can of battery cell 901, a round hole into which the protrusion is inserted is formed in one bus bar 940, and the protrusion is inserted into the round hole to perform laser welding. With this configuration, when bus bar 940 and electrode terminal 902 are welded, positioning can be performed with the protrusion and the round hole, and the welding position can also be visually recognized. However, this configuration has a problem that the welding strength cannot be increased in proportion to the area because the contact area is small at the time of welding with bus bar 940 and the area that can be welded is limited.

On the other hand, it is conceivable that a protrusion whose area is locally narrowed is not formed at the central part of the electrode terminal of the battery cell but is formed as a flat surface, and one bus bar is also formed as a flat surface to increase the contact area thereof to gain the area of welding. However, in this configuration, since there is no round hole for inserting the protrusion on the bus bar, there is a new problem that the outer shape of the electrode terminal cannot be visually recognized. In particular, when the electrode terminal is smaller than the connecting piece of the bus bar, the welding position is hidden by the bus bar, so that it is not possible to confirm whether the electrode terminal and the bus bar are accurately positioned. If the laser welding is performed in this state, the joint strength is not guaranteed for the electrode terminal and the bus bar which are not correctly positioned, and there is a possibility that the reliability is lowered.

Therefore, in the present exemplary embodiment, as described above, by opening positioning window 42 in bus bar 40 instead of the engagement with the electrode terminal, the position of electrode terminal 2 can be confirmed, and it can be confirmed that the relative positioning between electrode terminal 2 and bus bar 40 is correctly performed. Window 42 is opened in advance at a position where a part of the outer shape of electrode terminal 2 can be visually recognized in a case where it is assumed that electrode terminal 2 is at a predetermined position assumed as a fixing position in a state where bus bar 40 is overlapped with the fixing position at which electrode terminal 2 is joined. By opening window 42 at such a position, it is possible to confirm through window 42 that electrode terminal 2 is correctly arranged at an assumed position on the back side of bus bar 40.

Window 42 can be formed to be smaller than electrode terminal 2. That is, it is not necessary to form a large shape for engaging with electrode terminal 902 as illustrated in FIG. 17, and it is sufficient if a part of the outer shape and the height can be detected. By making window 42 small through-hole in this manner, the strength of bus bar 40 can be maintained. In other words, according to the present exemplary embodiment, it is possible to eliminate the need for a large hole for inserting the protrusion of electrode terminal 2 as in the related art.

In addition, it is assumed that bus bar 40 is formed larger than electrode terminal 2 in plan view in a state of being overlapped with electrode terminal 2 of battery cell 1. As described above, even when bus bar 40 is larger than electrode terminal 2 and electrode terminal 2 is inevitably hidden by bus bar 40, since electrode terminal 2 on the lower side can be visually recognized through window 42 as described above, the welding position and the height can be confirmed, and the reliability of laser welding can be enhanced. However, the above is not essential in the present invention, and for example, even when bus bar 40 is smaller than electrode terminal 2, the present invention can also be applied to a case where the posture of the part to be welded hidden behind bus bar 40 cannot be confirmed depending on the shape of electrode terminal 2.

Figure 5:
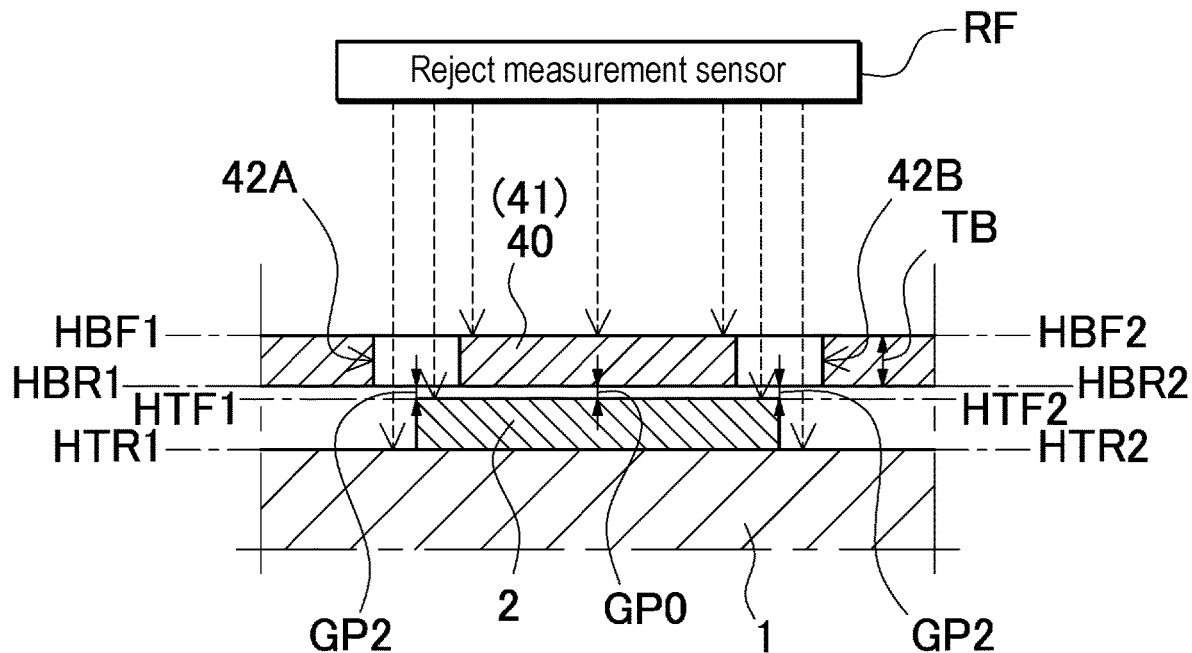
FIG. 5 is a schematic cross-sectional view taken along line V-V in FIG. 4.

In addition, not only the position of electrode terminal 2 exposed through window 42 but also the height of the front surface can be detected. In the plan view of FIG. 4, a height detection position where the front surface height of electrode terminal 2 is detected is indicated by HA. FIG. 5 is a schematic cross-sectional view taken along line V-V in FIG. 4. Since the height of the front surface of bus bar 40 can be detected at a part other than window 42, the height of the back surface of bus bar 40 can also be calculated by subtracting the known thickness of bus bar 40 from the height of the front surface of bus bar 40. Accordingly, gap GP between electrode terminal 2 and bus bar 40 can be calculated from the height of electrode terminal 2 and the height of the back surface of bus bar 40. At the time of welding bus bar 40 and electrode terminal 2, it is necessary that there is no gap or it is within a range of a slight gap allowed in welding processing, and this confirmation can be performed. The heights of the front surfaces of bus bar 40 and electrode terminal 2 can be easily determined using a distance measurement sensor. The distance measurement sensor can measure the height of the front surface using a known method capable of measuring the height, such as a triangulation method, a TOF (Time-Of-Flight) type, a capacitance type, an eddy current type, an ultrasonic type, or a contact type.

It is preferable that a plurality of windows 42 are opened in bus bar 40 so that electrode terminal 2 can be visually recognized from each window 42. With such a configuration, as shown in the cross-sectional view of FIG. 5, since the different positions of electrode terminal 2 can be confirmed through a plurality of windows 42A and 42B, the height of the different parts of electrode terminal 2 can be measured, and the gap GP at the welding position between the back surface of bus bar 40 and electrode terminal 2 can be calculated from the known thickness TB of bus bar 40. Specifically, in window 42A on the left in the drawing, distance measurement sensor RF measures height HTR1 of the upper surface of the battery cell 1, height HTF1 of the upper surface of electrode terminal 2, and height HBF1 of the upper surface of bus bar 40 forming window 42A. Then, height HBR1 on the back surface of bus bar 40 is calculated from thickness TB of bus bar 40 acquired in advance (HBR1=HBF1−TB). Further, gap GP1 between the back surface of bus bar 40 and the front surface of electrode terminal 2 in window 42A can be calculated from height HBR1 of the back surface side of bus bar 40 and height HTF1 of the upper surface of electrode terminal 2 (GP1=HBR1−HTF1).

Similarly, also in window 42B on the right in the drawing, height HTR2 of the upper surface of battery cell 1, height HTF2 of the upper surface of electrode terminal 2, and height HBF2 of the upper surface of bus bar 40 forming window 42B are measured by distance measurement sensor RF, and height HBR2 on the back surface of bus bar 40 is calculated (HBR2=HBF2−TB). Further, gap GP2 between the back surface of bus bar 40 and the front surface of electrode terminal 2 in window 42B is calculated from height HBR2 of the back surface of bus bar 40 and height HTF2 of the upper surface of electrode terminal 2 (GP2=HBR2−HTF2).

Gap GP0 at the welding position can be calculated from gap GP1 at window 42A and gap GP2 at window 42B. It is possible to easily calculate the gap of the welding position by designing formation positions of a plurality of windows 42 in advance such that the welding position is located between window 42A and window 42B. In the example of FIG. 5, assuming that the welding position is arranged between window 42A and window 42B and the front surface of electrode terminal 2 and the back surface of bus bar 40 are flat, gap GP0 at the welding position is an average value of gap GP1 at window 42A and gap GP2 at window 42B.

The plurality of windows 42 are preferably spaced apart and opened so as to sandwich fixing region FA where bus bar 40 and electrode terminal 2 are connected. With such an arrangement, the height of electrode terminal 2 can be measured at two positions facing each other with fixing region FA interposed therebetween, so that it is possible to more accurately calculate the gap in fixing region FA with the gap between electrode terminal 2 and bus bar 40 measured at windows 42 on both sides of fixing region FA. In other words, it is preferable to arrange windows 42 such that a straight line connecting the plurality of windows 42 intersects fixing region FA.

When electrode terminal 2 and bus bar 40 are fixed by laser welding as described above, fixing region FA is a laser welding region. The plurality of windows 42 facing each other with fixing region FA interposed therebetween are preferably opened on a contour defining a connection position connected to electrode terminal 2. As a result, in addition to the detection of the height, that is, the gap, the confirmation that the electrode terminal 2 is at the connection position can also be performed with the same window 42.

Second Exemplary Embodiment

Figure 6:
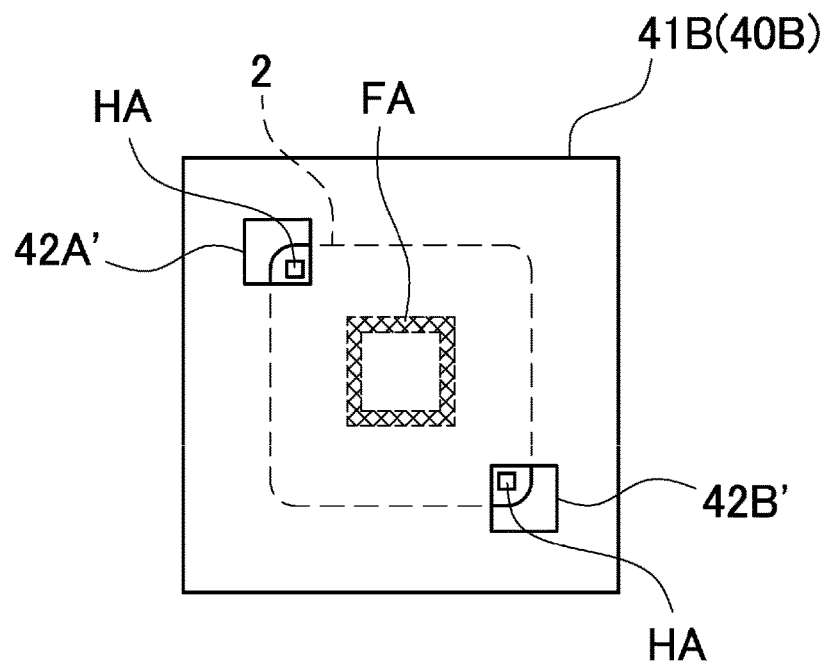
FIG. 6 is a schematic plan view illustrating a connecting piece of a bus bar of a power supply device according to a second exemplary embodiment.

The arrangement of windows 42 facing each other is not limited to the example in which the windows are arranged on the left and right sides of the rectangular contour that defines the connection position of electrode terminal 2 as shown in FIG. 4, and the windows may be arranged on the upper and lower sides, for example. Alternatively, it may be on a diagonal line. Here, as a power supply device according to the second exemplary embodiment, an example of a plan view of connecting piece 41B of bus bar 40B including a plurality of windows 42A' and 42B' opened is illustrated in FIG. 6. In this example, windows 42A' and 42B' are opened at diagonal positions of electrode terminal 2, respectively. As described above, since the height of electrode terminal 2 can be measured at the two diagonal positions, it is possible to more accurately calculate the gap between electrode terminal 2 and bus bar 40B.

Third Exemplary Embodiment

Figure 7:
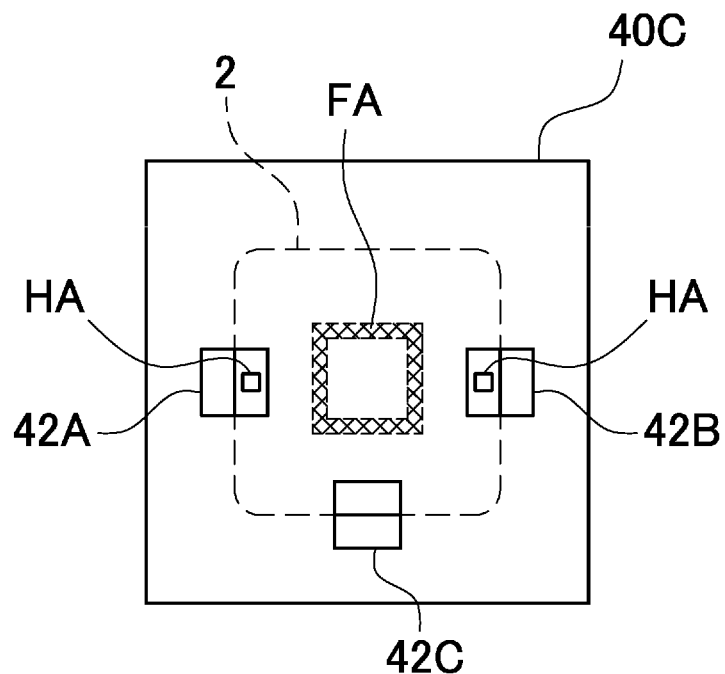
FIG. 7 is a schematic plan view illustrating a connecting piece of a bus bar of a power supply device according to a third exemplary embodiment.

It is needless to say that the number of the plurality of windows is not limited to two, and may be three or more. For example, in bus bar 40C of a power supply device according to a third exemplary example illustrated in FIG. 7, in the contour that defines the connection position of electrode terminal 2 arranged on the back surface of bus bar 40C, in addition to windows 42A and 42B arranged in the middle of the left and right sides, window 42C is also formed in the middle of the lower side, and positioning and gap confirmation are performed by a total of three windows 42.

Fourth Exemplary Embodiment

Figure 8:
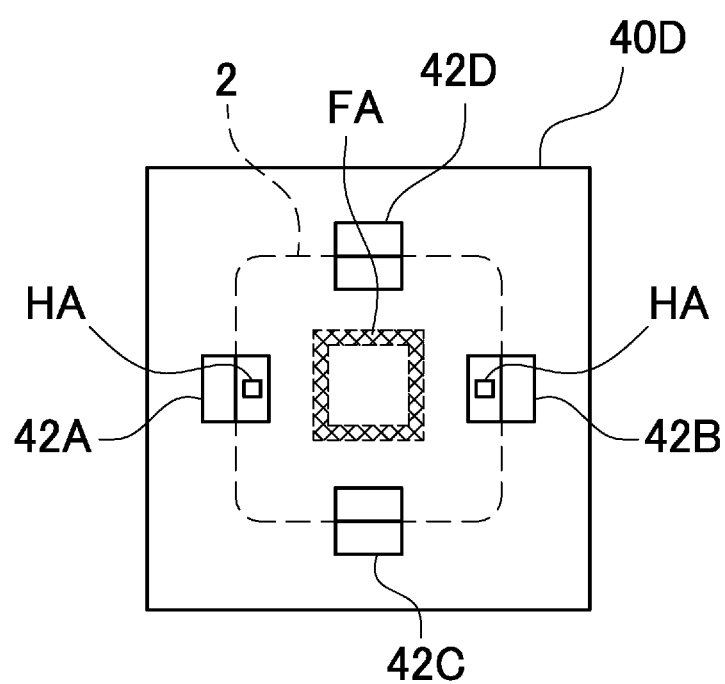
FIG. 8 is a schematic plan view illustrating a connecting piece of a bus bar of a power supply device according to a fourth exemplary embodiment.

In addition, in bus bar 40D of a power supply device according to a fourth exemplary embodiment illustrated in FIG. 8, in addition to windows 42A and 42B arranged on the left and right sides of the contour that defines the connection position of electrode terminal 2, windows 42C and 42D are also formed in the middle of the upper and lower sides to form a total of four windows 42. By providing more windows 42 in this manner, it is possible to increase the number of measurement points and further improve the reliability of connection of electrode terminal 2.

Fifth Exemplary Embodiment

In addition, in the above example, an example in which the window is mainly opened in a rectangular shape has been described, but in the present invention, the shape of the window is not limited to a rectangular shape, and any shape such as a polygonal shape such as a rhombus shape, a hexagon shape, and an octagon shape, a circular shape, an elliptical shape, and a track shape can be used. In addition, the window does not necessarily need to be formed in an annular shape with its periphery closed, and it is sufficient that the electrode terminal on the lower surface of the bus bar can be visually recognized from above.

Figure 9:
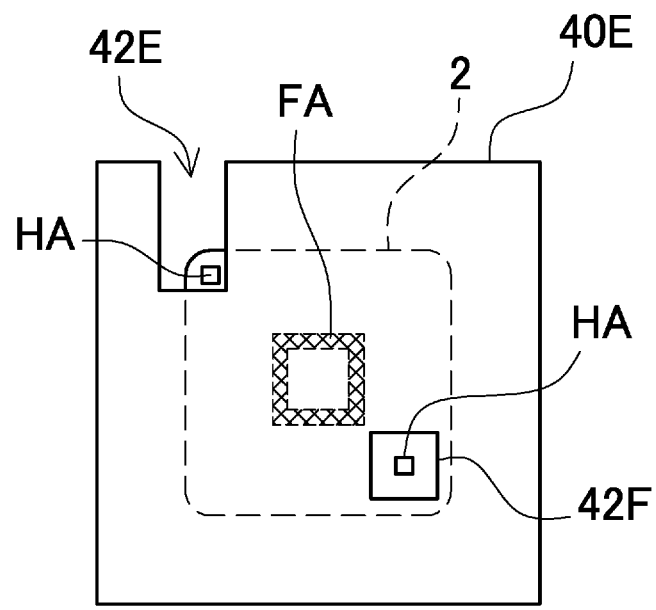
FIG. 9 is a schematic plan view illustrating a connecting piece of a bus bar of a power supply device according to a fifth exemplary embodiment.

For example, in bus bar 40E of the power supply device according to a fifth exemplary embodiment illustrated in FIG. 9, window 42E formed so that an upper left corner part of a contour defining a connection position of electrode terminal 2 can be visually recognized is formed in a notched shape from an end edge of bus bar 40E. As described above, in the present specification, the window opened in the bus bar means a shape in which a part of the electrode terminal on the back surface of the bus bar can be visually recognized regardless of the name of the window, and is used in a meaning including a notch.

In addition, it is not necessary that all of the plurality of windows are formed on the contour defining the connection position of the electrode terminal arranged on the back surface of the bus bar, and some of the windows may be formed such that only the inside of the window is exposed instead of the contour part of the electrode terminal. Such a window is mainly used for detecting the height of the electrode terminal, that is, the gap between the electrode terminal and the bus bar. For example, in the example of FIG. 9, lower right window 42F is used only for detecting the height of electrode terminal 2, and is not used for confirming the positioning of electrode terminal 2. As described above, in the present specification, it is not necessary that all the windows can be used to confirm the connection positions of the electrode terminals.

Sixth Exemplary Embodiment

Figure 10:
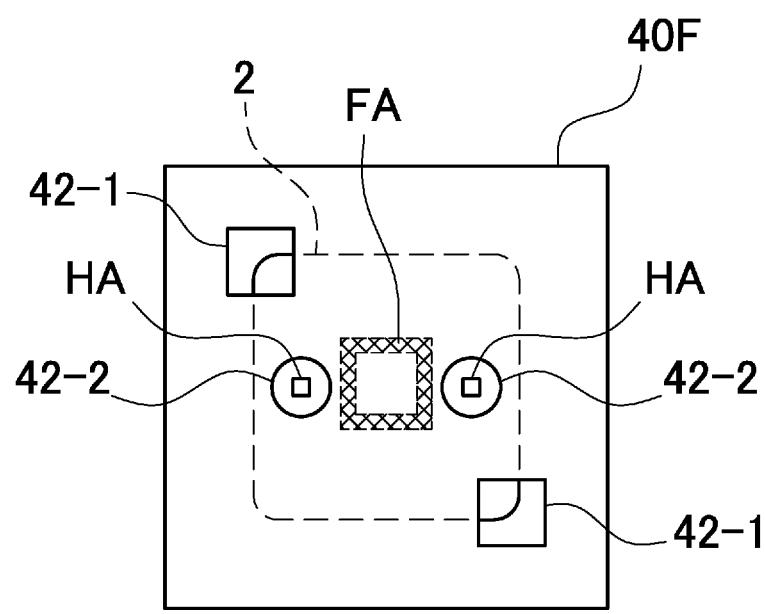
FIG. 10 is a schematic plan view illustrating a connecting piece of a bus bar of a power supply device according to a sixth exemplary embodiment.

In addition, in the example of FIG. 6 and the like, an example has been described in which the outer shape of electrode terminal 2 is detected and the height of electrode terminal 2 is performed in each window 42. However, the present invention is not limited to this configuration, and as the window, an outer-shape window for detecting the outer shape of the electrode terminal and a height window for detecting the height of the electrode terminal may be opened. By separating the windows for outer shape detection and height detection in this manner, the windows can be provided at positions suitable for outer shape detection and at positions suitable for height detection, respectively. In addition, since the outer shape detection and the height detection can be performed in each part, it is possible to obtain an advantage that a plurality of processes can be performed simultaneously in parallel. For example, in bus bar 40F of the power supply device according to a sixth exemplary embodiment illustrated in FIG. 10, the outer-shape windows 42-1 are provided diagonally to electrode terminal 2, while height window 42-2 is provided on both sides so as to sandwich the welding position. By measuring the height position at a part close to the welding position in this manner, it is possible to expect more accurate height detection.

Seventh Exemplary Embodiment

Figure 11:
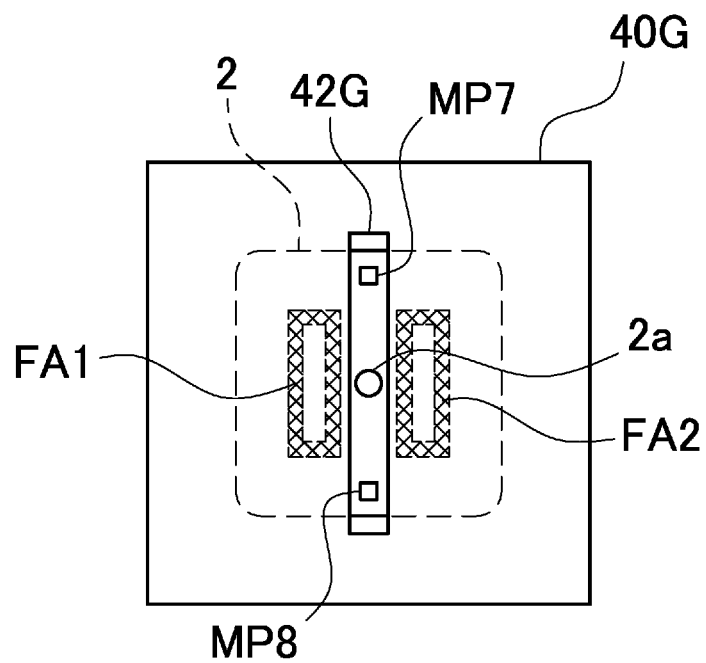
FIG. 11 is a schematic plan view illustrating a connecting piece of a bus bar of a power supply device according to a seventh exemplary embodiment.

Further, in the above example, the configuration in which the plurality of windows are formed to detect the outer shape and the height of the bus bar has been described, but the number of windows is not limited to a plurality, and only one window may be provided in the present invention. In this case, by forming the window into an elongated shape, the height of the electrode terminal exposed from the window can be detected at a plurality of parts, and the connection position can be confirmed. Such an example is illustrated in FIG. 11 as bus bar 40G of the power supply device according to a seventh exemplary embodiment. In this example, the window 42G is formed in a vertically long slit shape so as to vertically straddle the contour defining the connection position. With elongated window 42G as described above, the height of electrode terminal 2 at different positions can be measured with common window 42G, and the outer shape of electrode terminal 2 can also be acquired.

In addition, the window preferably has an elongated hole shape longer than the width of the electrode terminal. As a result, the facing end edges of the electrode terminal can be visually recognized from one window, and the inclination of the electrode terminal can be detected from one window. For example, in the example of FIG. 11, the gap is calculated at each of measurement position MP7 above window 42G formed in a vertically long shape and the measurement position MP8 below the window. Accordingly, the gap between fixing regions FA formed on the left and right sides of measurement positions MP7, MP8 is estimated. In particular, when recess 2a is formed in the middle of electrode terminal 2 as shown in FIG. 11, the height of both sides sandwiching recess 2a can be measured to estimate the gap near recess 2a. When recess 2a is formed in the middle of electrode terminal 2, recess 2a can be recognized as the reference position of the terminal plane.

A plurality of fixing regions for fixing the bus bar and the electrode terminal may be provided as described above. In the example of FIG. 11, fixing regions FA1, FA2 are arranged on the left and right sides with elongated window 42G interposed therebetween. As a result, fixing such as laser welding can be performed at a plurality of places in the vicinity of the region where the gap is detected, and the reliability of connection between bus bar 40G and electrode terminal 2 can be enhanced. In other words, in a case where there is a plurality of fixing regions, it can be said that it is preferable to arrange such that a line connecting the plurality of fixing regions FA1, FA2 intersects window 42G. Of course, in window 42G, since bus bar 40G and electrode terminal 2 cannot be welded, the intersecting part is excluded from the fixing region.

Eighth Exemplary Embodiment

Figure 12:
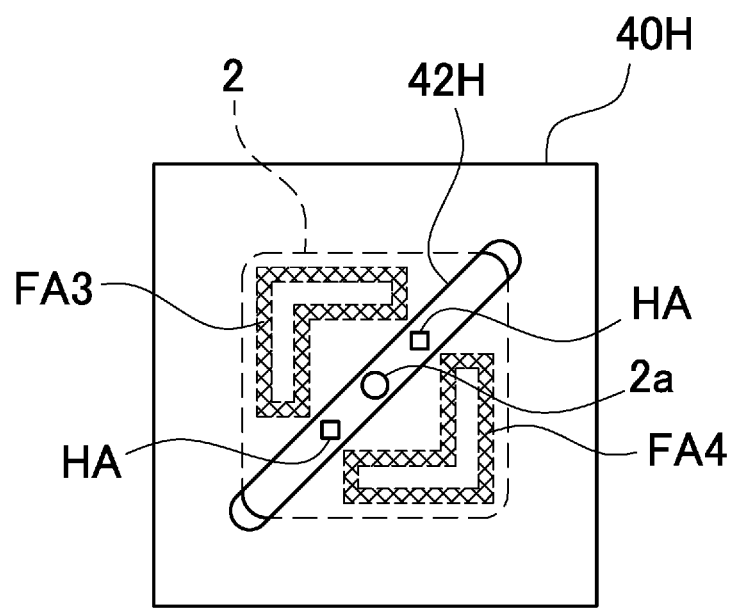
FIG. 12 is a schematic plan view illustrating a connecting piece of a bus bar of a power supply device according to an eighth exemplary embodiment.

Furthermore, elongated common window 42 is not limited to the configuration in which it is opened so as to straddle the upper and lower sides of the contour that defines the connection position as illustrated in FIG. 11, and may be arranged so as to straddle the left and right sides of the contour, for example. Alternatively, it may be formed diagonally with respect to the rectangular contour. An example of this is shown as bus bar 40H of the power supply device according to an eighth exemplary embodiment in a schematic plan view in FIG. 12. In this example, window 42H is opened so as to connect the upper right corner part and the lower left corner part of the rectangular shape defining the contour. Even in such an arrangement, similarly, it is possible to detect the position of electrode terminal 2 and the gap between electrode terminal 2 and bus bar 40H from common window 42H, and it is possible to maintain the reliability of the connection between electrode terminal 2 and bus bar 40H.

The fixing region between the electrode terminal and the bus bar is not necessarily provided at the center of the electrode terminal, and may be provided in a frame shape or a line shape along the outer shape of the electrode terminal, for example. As an example, in the example illustrated in FIG. 12, fixing regions FA3, FA4 are L-shaped, and L-shaped fixing regions FA3, FA4 are arranged in a posture facing each other along the connection position of electrode terminal 2.

Method of Manufacturing Power Supply Device

Here, an example of a method of manufacturing the above-described power supply device will be described. First, battery stack 10 in which a plurality of battery cells 1 each including electrode terminal 2 are stacked, and bus bar 40 that connects electrode terminals 2 of adjacent battery cells 1 and includes window 42 opened in advance is prepared. Next, bus bar 40 is overlapped with electrode terminal 2 of battery cell 1, and a part of electrode terminal 2 is visually recognized through window 42 to confirm whether bus bar 40 and electrode terminal 2 are correctly positioned at the welding position. Then, bus bar 40 whose positioning is confirmed is welded to battery cell 1. In addition, when the positioning fails, necessary measures are taken such as performing positioning again as necessary. In this way, even in a state where bus bar 40 is stacked on electrode terminal 2, electrode terminal 2 on the lower side can be visually recognized through window 42, so that the welding position and the height can be confirmed, and the reliability of welding can be enhanced.

In addition, the step of confirming the positioning can include a step of measuring the height of electrode terminal 2 by visually recognizing a part of electrode terminal 2 through window 42 in a state where bus bar 40 overlaps electrode terminal 2 of battery cell 1, and a step of calculating the gap between the back surface of bus bar 40 and the front surface of electrode terminal 2 based on the known thickness of bus bar 40. As a result, by acquiring the gap between the back surface of bus bar 40 and electrode terminal 2, it is possible to take necessary measures even if the strength of welding between bus bar 40 and electrode terminal 2 cannot be secured when the gap is large, and the reliability of welding can be improved.

Power supply device 100 described above can be used as a power source for a vehicle that supplies electric power to a motor that causes an electric vehicle to travel. As an electric vehicle on which power supply device 100 is mounted, an electric vehicle such as a hybrid automobile or a plug-in hybrid automobile that travels by both an engine and a motor, or an electric automobile that travels only by a motor can be used, and is used as a power source of these vehicles. Note that, in order to obtain power for driving the electric vehicle, an example will be described in which a large number of the above-described power supply devices 100 are connected in series or in parallel, and a large-capacity and high-output power supply device to which a necessary controlling circuit is further added is constructed.

(Power Supply Device for Hybrid Vehicle)

Figure 13:
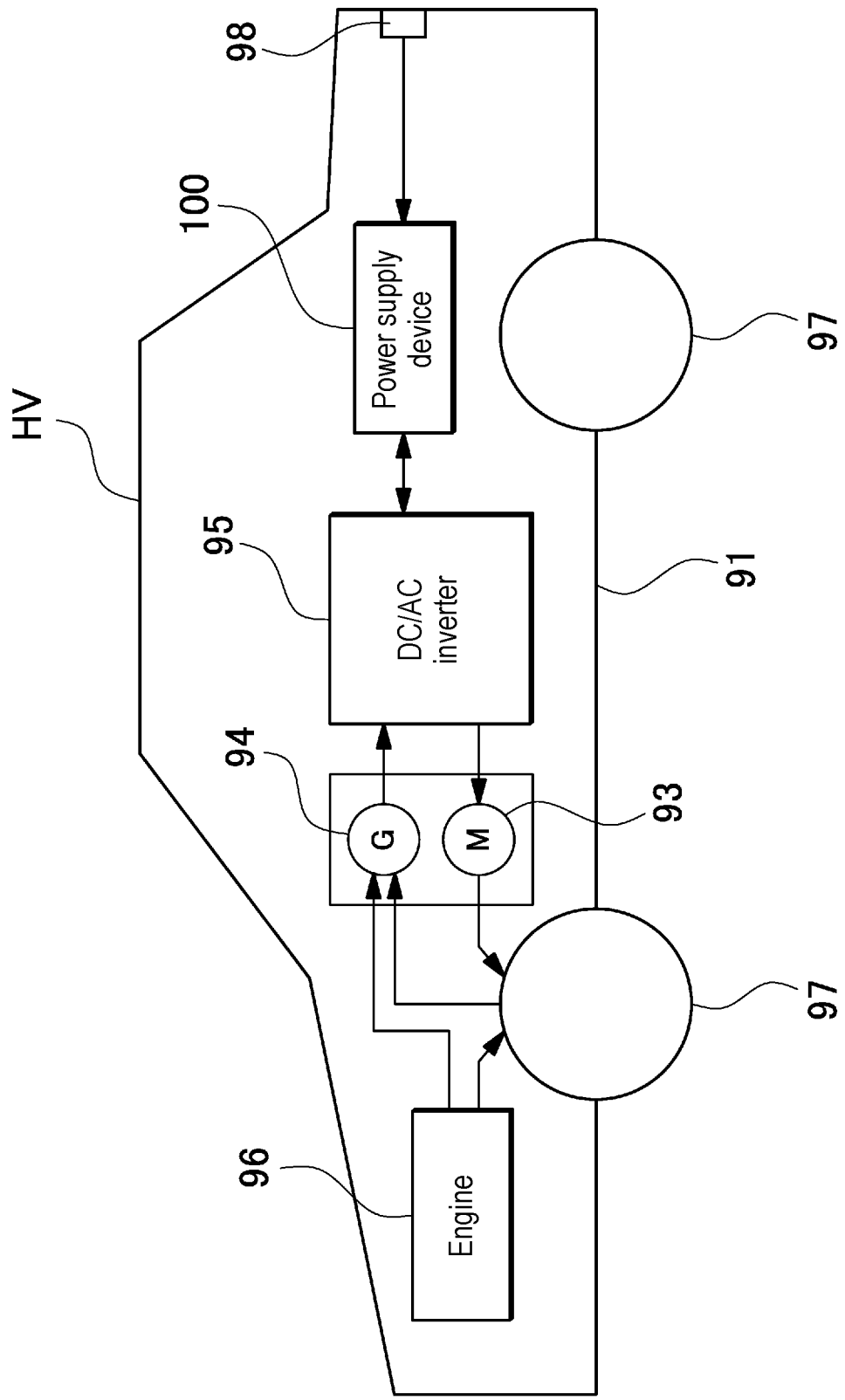
FIG. 13 is a block diagram illustrating an example in which a power supply device is mounted on a hybrid vehicle that travels with an engine and a motor.

FIG. 13 illustrates an example in which power supply device 100 is mounted on a hybrid automobile that travels by both an engine and a motor. Vehicle HV on which power supply device 100 illustrated in this drawing is mounted includes vehicle body 91, engine 96 and drive motor 93 that cause vehicle body 91 to travel, wheels 97 driven by engine 96 and drive motor 93, power supply device 100 that supplies electric power to motor 93, and generator 94 that charges a battery of power supply device 100. Power supply device 100 is connected to motor 93 and generator 94 via DC/AC inverter 95. Vehicle HV travels by both motor 93 and engine 96 while charging and discharging the battery of power supply device 100. Motor 93 is driven to cause the vehicle to travel in an area with poor engine efficiency, for example, at the time of acceleration or low speed traveling. Motor 93 is driven by electric power supplied from power supply device 100. Generator 94 is driven by engine 96 or by regenerative braking when braking the vehicle to charge the battery of power supply device 100. As shown in FIG. 13, vehicle HV may be provided with charging plug 98 for charging power supply device 100. Power supply device 100 can be charged by connecting charging plug 98 to an external power source.

(Power Supply Device for Electric Automobile)

Figure 14:
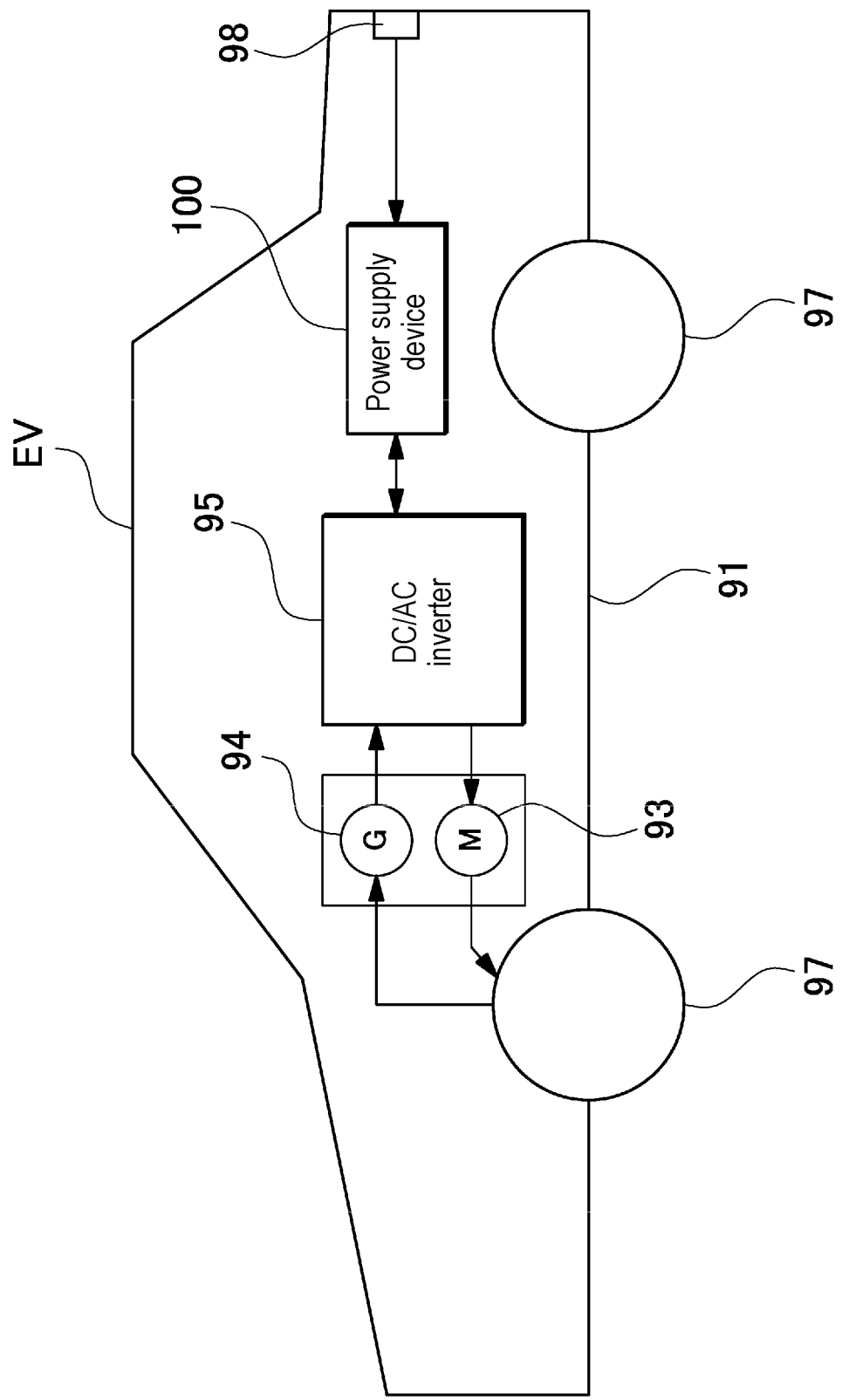
FIG. 14 is a block diagram illustrating an example in which a power supply device is mounted on an electric automobile that travels only with a motor.

Further, FIG. 14 illustrates an example in which power supply device 100 is mounted on an electric automobile that travels only by a motor. Vehicle EV on which power supply device 100 illustrated in this drawing is mounted includes vehicle body 91, drive motor 93 that causes vehicle body 91 to travel, wheels 97 driven by motor 93, power supply device 100 that supplies electric power to motor 93, and generator 94 that charges a battery of power supply device 100. Power supply device 100 is connected to motor 93 and generator 94 via DC/AC inverter 95. Motor 93 is driven by electric power supplied from power supply device 100. Generator 94 is driven by an energy at the time of regenerative braking of vehicle EV to charge the battery of power supply device 100. Further, vehicle EV includes charging plug 98, and power supply device 100 can be charged by connecting charging plug 98 to an external power source.

(Power Supply Device for Power Storage Apparatus)

Figure 15:
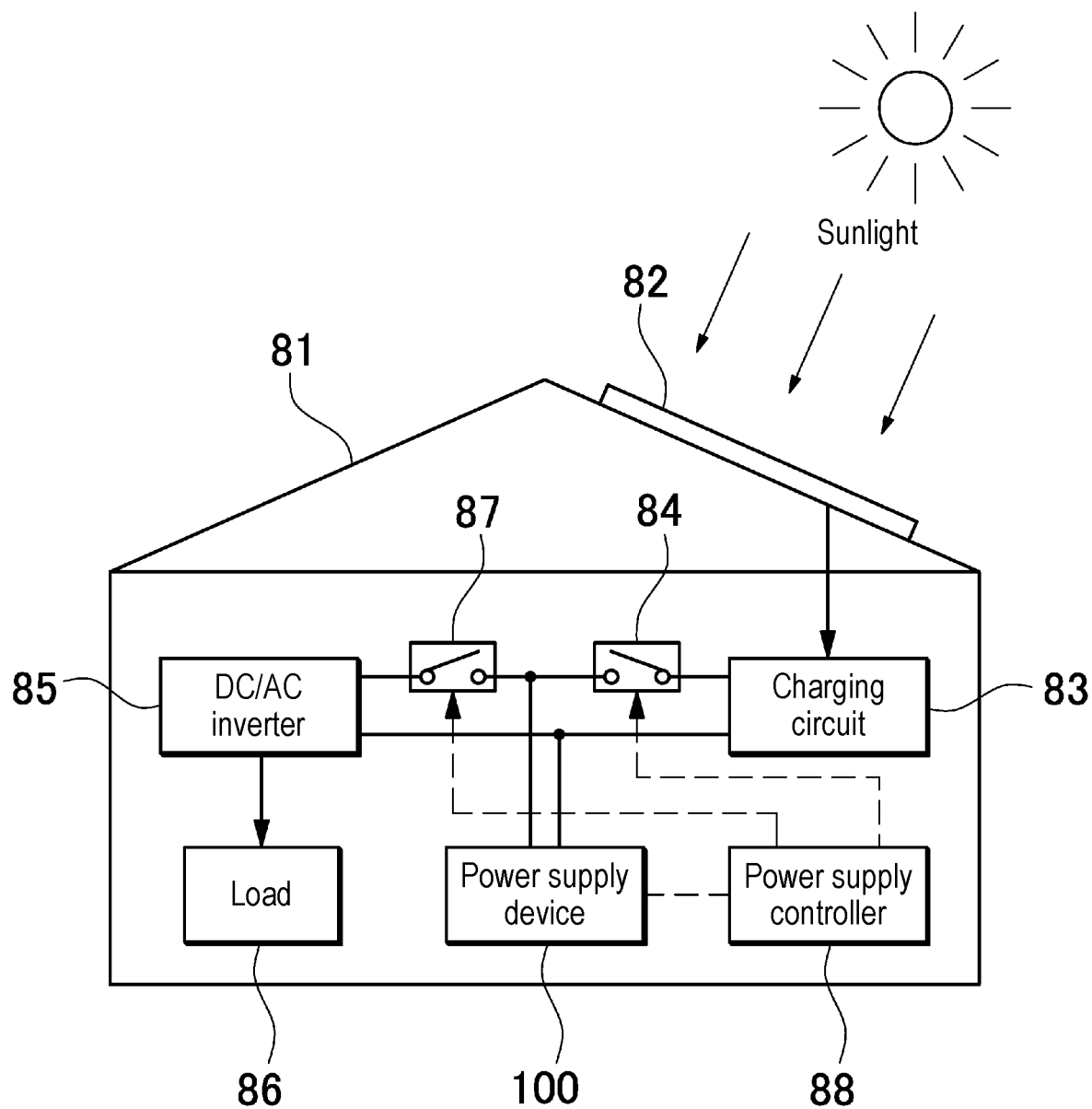
FIG. 15 is a block diagram illustrating an example of applying a power supply device for power storage.

Furthermore, the present invention does not specify the application of the power supply device as the power source of the motor that causes the vehicle to travel. The power supply device according to the exemplary embodiment can also be used as a power source of a power storage apparatus that charges and stores a battery with electric power generated by solar power generation, wind power generation, or the like. FIG. 15 illustrates a power storage device that charges and stores a battery of power supply device 100 with solar battery 82.

The power storage device illustrated in FIG. 15 charges the battery of power supply device 100 with electric power generated by solar battery 82 arranged on a roof, a rooftop, or the like of building 81 such as a house or a factory. In this power storage apparatus, the battery of power supply device 100 is charged by charging circuit 83 using solar battery 82 as a charging power source, and then electric power is supplied to load 86 via DC/AC inverter 85. Therefore, the power storage apparatus has a charge mode and a discharge mode. In the power storage apparatus illustrated in the drawing, DC/AC inverter 85 and charging circuit 83 are connected to power supply device 100 via discharge switch 87 and charge switch 84, respectively. ON/OFF of discharge switch 87 and charge switch 84 is switched by power supply controller 88 of the power storage apparatus. In the charge mode, power supply controller 88 switches charge switch 84 to ON and switches discharge switch 87 to OFF to permit charging from charging circuit 83 to power supply device 100. Further, when the charging is completed and the battery is fully charged, or in a state where a capacity larger than or equal to a predetermined value is charged, power supply controller 88 turns off charge switch 84 and turns on discharge switch 87 to switch to the discharge mode, and permits discharging from power supply device 100 to load 86. As necessary, power supply controller 88 can supply electric power to load 86 and charge power supply device 100 simultaneously by turning on charge switch 84 and turning on discharge switch 87.

Although not illustrated, the power supply device can also be used as a power source of an electrical storage device that performs power storage by charging a battery using midnight electric power at night. The power supply device charged with the midnight electric power can be charged with midnight electric power that is surplus electric power of a power plant, output electric power in the daytime when an electric power load becomes large, and limit a peak electric power in the daytime to be small. Furthermore, the power supply device can also be used as a power source that charges with both the output of the solar battery and the midnight electric power. This power supply device can efficiently perform power storage effectively using both electric power generated by the solar battery and the midnight electric power in consideration of weather and electric power consumption.

The power storage system as described above can be suitably used for applications such as a backup power supply device that can be mounted on a rack of a computer server, a backup power supply device for a wireless base station such as a cellular phone, a power source for household or factory power storage, a power source for street lamps, and the like, a power storage apparatus combined with a solar battery, and a backup power source for traffic lights and traffic indicators for roads.

INDUSTRIAL APPLICABILITY

A power supply device according to the present invention, and a vehicle and a power storage apparatus including the power supply device can be suitably used as a power source for a large current used for a power source of a motor for driving an electric vehicle such as a hybrid vehicle, a fuel battery automobile, an electric automobile, or an electric motorcycle. Examples thereof include power supply devices for plug-in hybrid electric automobiles and hybrid electric automobiles capable of switching between an EV traveling mode and an HEV traveling mode, electric automobiles, and the like. Further, the present invention can be appropriately used for applications such as a backup power supply device that can be mounted on a rack of a computer server, a backup power supply device for a wireless base station such as a cellular phone, a power source for power storage for home and factory use, a power source for street lamps, and the like, a power storage apparatus combined with a solar battery, and a backup power source for traffic lights and the like.

REFERENCE MARKS IN THE DRAWINGS

100, 900: power supply device
1: battery cell
1X: terminal surface
1*a*: exterior can
1*b*: sealing plate
1*c*: gas discharge valve
2: electrode terminal
2*a*: recess
10: battery stack
15: fastening member
15*a*: fastening main surface
15*d*: bent piece
15*f*: bolt
16: insulating spacer
17: end surface spacer
20: end plate
30: insulating sheet
31: flat plate
32: bent cover part
40, 40B, 40C, 40D, 40E, 40F, 40G, 40H: bus bar
41, 41B: connecting piece
42, 42A, 42B, 42A', 42B', 42C, 42D, 42E, 42F, 42G, 42H: window
42-1: outer-shape window
42-2: height window
81: building
82: solar battery
83: charging circuit
84: charge switch
85: DC/AC inverter
86: load
87: discharge switch
88: power supply controller
91: vehicle body
93: motor
94: generator
95: DC/AC inverter
96: engine
97: wheel
98: charging plug 901: battery cell
802, 902: electrode terminal
903: end plate
904: bind bar
910: battery stack
840, 940: bus bar
HA: height detection position
FA, FA1, FA2, FA3, FA4: fixing region
GP0, GP1, GP2: gap between electrode terminal and bus bar
RF: distance measurement sensor
HTR1, HTR2: height of upper surface of battery cell
HTF1, HTF: height of upper surface of electrode terminal
HBF1, HBF2: height of upper surface of bus bar
TB: thickness of bus bar
HBR1, HBR2: height of back surface of bus bar
HV, EV: vehicle

The invention claimed is:

1. A power supply device comprising:
    a battery stack including a plurality of battery cells stacked, the plurality of battery cells including electrode terminals on upper surfaces of outer covering cans of the battery cells, each of the electrode terminals including uppermost surface; and
    a plurality of bus bars each connecting a corresponding pair of the electrode terminals of adjacent battery cells among the plurality of battery cells,
    wherein each of the plurality of bus bars is larger than the corresponding one of the electrode terminals of the plurality of battery cells thereby an outline of the corresponding electrode terminal is hidden by the bus bar and defines a window for visually recognizing not all but a part of the uppermost surface of the electrode terminals of at least one of the adjacent battery cells in a state where each of the plurality of bus bars is overlapped with the electrode terminals in plan view in order to detect the outline of the corresponding electrode terminal.

2. The power supply device according to claim 1, wherein each of the plurality of bus bars includes a plurality of windows each being the window opened, and
    the electrode terminals of the adjacent battery cells are visually recognizable from the plurality of the windows.

3. The power supply device according to claim 2, wherein each of the plurality of bus bars includes the plurality of the windows, the plurality of the windows being separated from each other to sandwich a fixing region where each of the plurality of bus bars and a corresponding one of the electrode terminals is connected.

4. The power supply device according to claim 2, wherein the plurality of the windows are opened at diagonal positions of the electrode terminals.

5. The power supply device according to claim 2, wherein the plurality of windows include:
    an outer-shape window for detecting an outer shape of each of the electrode terminals; and
    a height window for detecting a height of each of the electrode terminals.

6. The power supply device according to claim 1, wherein each of the plurality of the windows is in a corresponding one of the plurality of bus bars in a rectangular shape.

7. The power supply device according to claim 1, wherein each of the plurality of the windows is opened in an elongated hole shape longer than a width of the corresponding one of the electrode terminals.

8. The power supply device according to claim 1, wherein each of the plurality of the windows is smaller than the corresponding one of the electrode terminals.

9. The power supply device according to claim 1, wherein a connecting part between each of the plurality of bus bars and the corresponding one of the electrode terminals is a laser welding part.

10. The power supply device according to claim 1, wherein the electrode terminals each includes a recess.

11. A vehicle including the power supply device according to claim 1, the vehicle comprising:
    the power supply device;
    a motor for traveling supplied with electric power from the power supply device;
    a vehicle body equipped with the power supply device and the motor; and
    a wheel that is driven by the motor to cause the vehicle body to travel.

12. A power storage device including the power supply device according to claim 1, the power storage device comprising:
    the power supply device; and
    a power supply controller that controls charging to and discharging from the power supply device,
    wherein the power supply controller enables charging to the plurality of battery cells with electric power from an outside, and controls charging to the plurality of battery cells.

13. A method of manufacturing a power supply device, the method comprising:
    preparing a battery stack including a plurality of battery cells stacked, each of the plurality of battery cells including electrode terminals, each of the electrode terminals including uppermost surface, and a bus bar each connecting a corresponding pair of the electrode terminals of adjacent battery cells among the plurality of battery cells, the bus bar being larger than the corresponding one of the electrode terminals of the plurality of battery cells thereby an outline of the corresponding electrode terminal is hidden by the bus bar and defining a window;
    detecting the outline of the corresponding electrode terminal and confirming positioning to confirm whether the bus bar and the electrode terminals are correctly positioned at a welding position by overlapping the bus bar with the electrode terminals of the plurality of battery cells and visually recognizing not all but a part of the uppermost surface of the electrode terminals through the window; and
    welding the bus bar whose positioning is confirmed to a corresponding one of the plurality of battery cells.

14. The method of manufacturing the power supply device according to claim 13, wherein the confirming positioning comprises:
    measuring a height of the electrode terminals by visually recognizing a part of the electrode terminal through the window in a state where the bus bar is overlapped with the electrode terminals of the plurality of battery cells; and
    calculating a gap between a back surface of the bus bar and front surfaces of the electrode terminals based on a known thickness of the bus bar.

15. The method of manufacturing the power supply device according to claim 13, wherein the welding the bus bar to the corresponding one of the plurality of battery cells is performed by laser welding.

\* \* \* \* \*